Sept. 7, 1937.   H. R. PERRY ET AL   2,092,737
CONVEYER
Filed Aug. 25, 1933   4 Sheets-Sheet 1
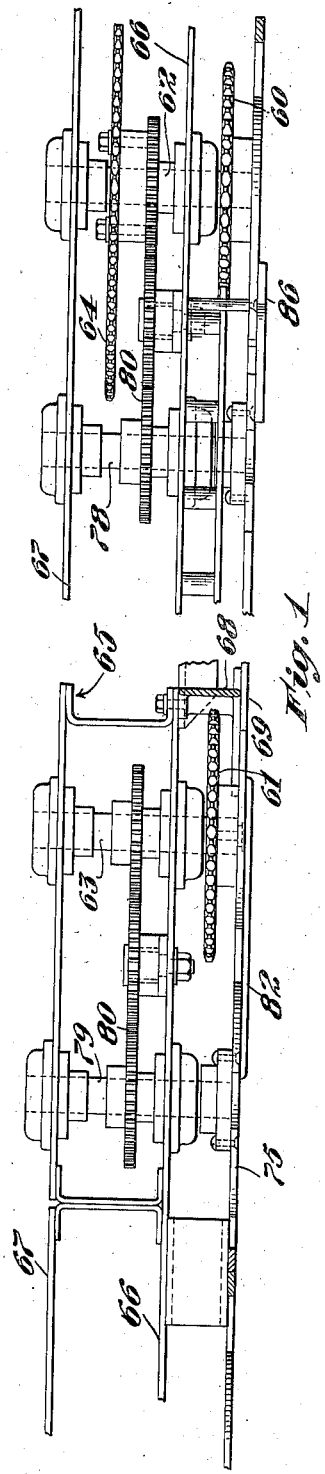
Inventor
Harold R. Perry
Chester S. Jennings
by Roberts, Cushman and Woodbury
Attys.

Inventors
Harold R. Perry
Chester S. Jennings

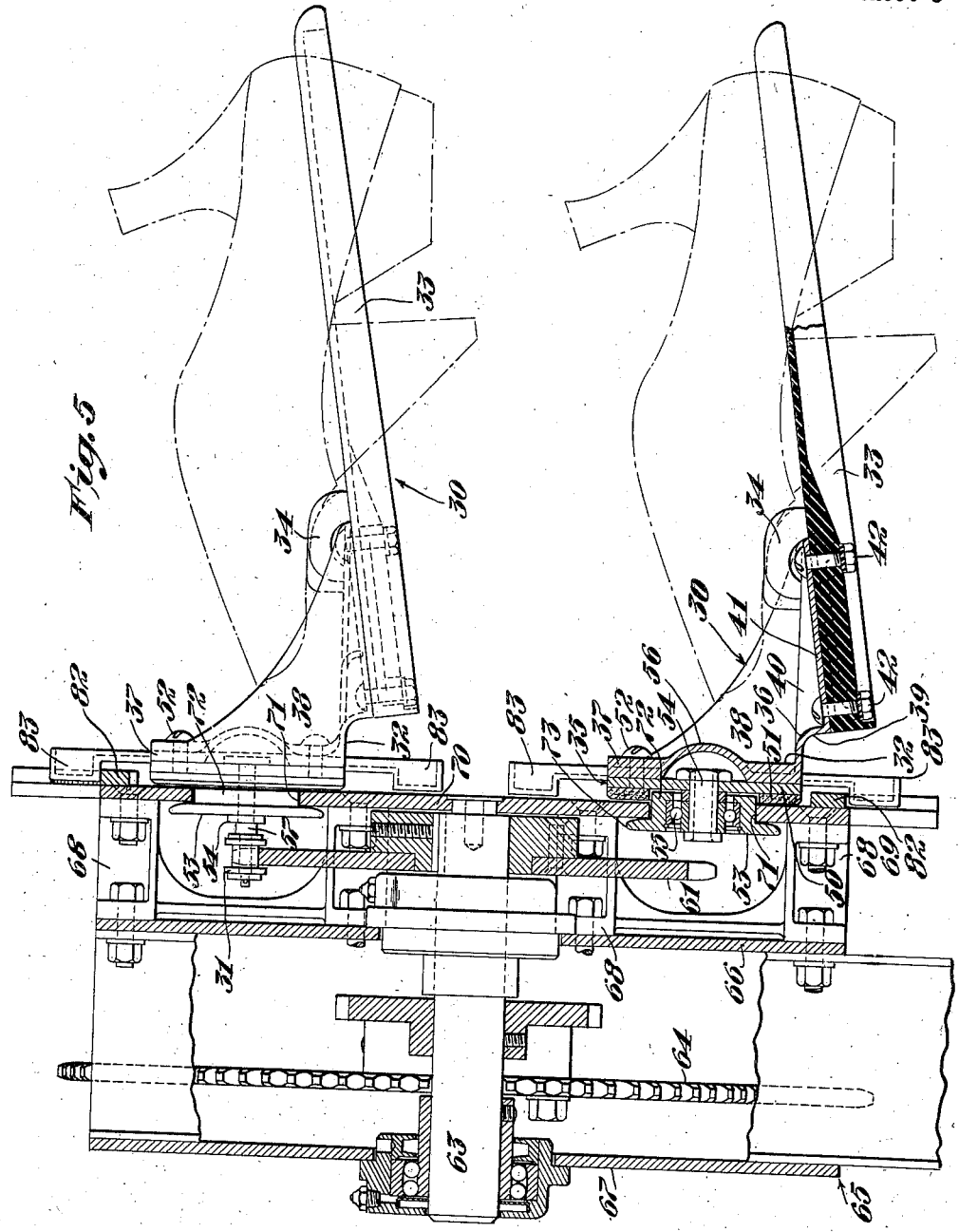

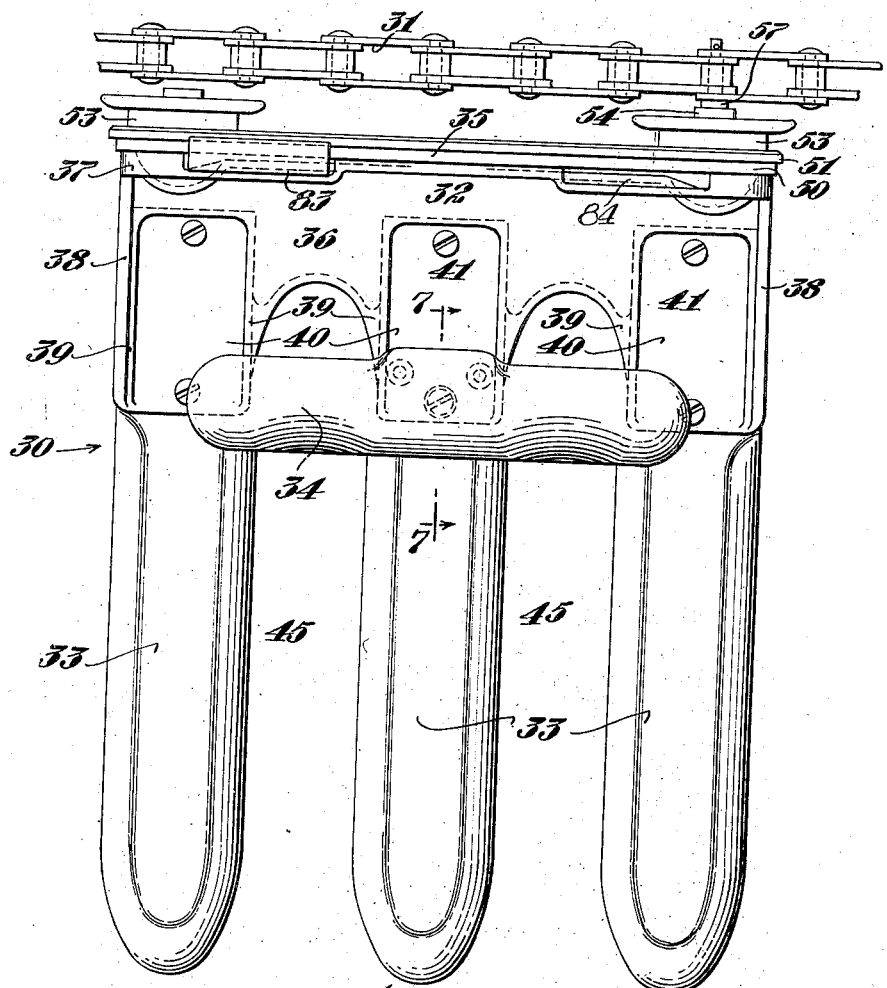

Patented Sept. 7, 1937

2,092,737

UNITED STATES PATENT OFFICE 2,092,737

CONVEYER

Harold R. Perry, Swarthmore, Pa., and Chester S. Jennings, Syracuse, N. Y., assignors to The Lamson Company, Syracuse, N. Y., a corporation of Massachusetts Application August 25, 1933, Serial No. 686,814

13 Claims. (Cl. 198—138)

This invention relates to an improvement in conveyers and, like our copending application Serial No. 674,624, filed June 7, 1933, which matured into Patent No. 2,000,417 on May 7, 1935 relates to apparatus capable of carrying out the invention disclosed in the copending application of Harold R. Perry, Serial No. 658,305, filed February 24, 1933, now Patent No. 1,948,127, dated February 20, 1934.

As in the other applications the apparatus disclosed is particularly adapted for the treatment and transportation of shoes and the invention will be so described. It will be understood, however, that it is not limited thereto and that other uses may be made thereof.

One object of this invention is to provide in a layout of the type disclosed in the Perry application mentioned above a conveyer on which shoes are conditioned by travelling for a predetermined period in the atmosphere, such conveyer being in a substantially horizontal plane above other conveyers travelling in vertical planes.

Another object of this invention is to provide racks upon which shoes are transported, such racks being carried by a single chain as distinguished from the racks shown in our copending application which are carried by two chains.

A further object of this invention resides in the construction of the rack supporting chains, the driving and take-up mechanism therefor, and the guides which coact with the cars to insure their proper positioning as they travel around the ends of the conveyer.

Other objects will appear from a consideration of the following description and of the drawings which form a part thereof, and in which Figs. 1 and 2 are plan and side elevations respectively of a conveyer embodying this invention;

Fig. 5 is a sectional view through such conveyer showing racks on the upper and lower runs thereof;

Fig. 6 is a plan view of such rack;

Fig. 7 is an enlarged sectional view taken along the line 7—7 of Fig. 6;

Fig. 8 is a sectional view taken along the line 8—8 of Fig. 7.

Figure 3:
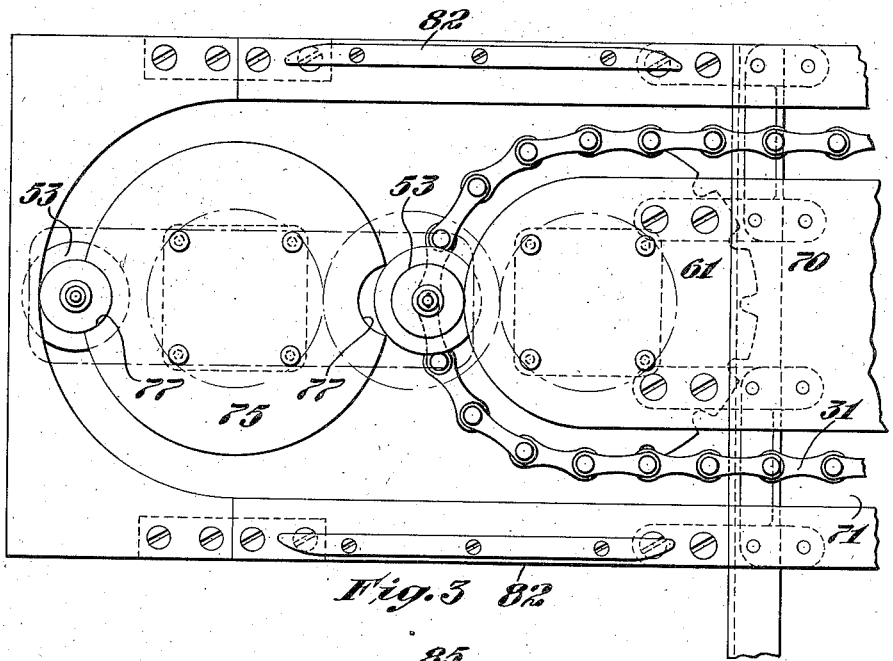
Fig. 3 is an enlarged side elevation of the take-up end of such conveyer.

The conveyer illustrating this invention comprises a single chain 31 upon which are supported a plurality of cars 30, hereinafter referred to as racks, by which shoes are transported.

Each of the racks 30 (Figs. 5 to 8 inclusive) carried by the chain 31 of the conveyer comprises a support 32 to which are removably secured paddles 33, a toe rest 34, and a rack guiding member 35. The support 32 is angular in cross section (see Fig. 5) having a horizontal flange 36, a vertical flange 37 and walls 38, preferably integral with the flanges and connecting the ends thereof. Each rack here shown is adapted to carry a pair of shoes and the flange 36 is provided with three tongues 39. In the surface of the flange 36 at each tongue is formed a depression 40, the base 41 of which, as shown particularly in Fig. 5, is upwardly and outwardly inclined.

The paddles 33 extend outwardly from the support 32 parallel to each other and are removably secured to the under side of the bases 41 as by bolts 42 which pass through one end of each paddle. The toe rest 34 is secured removably to the intermediate tongue 39 as by screws 43 (see Fig. 8) which pass through holes 44 formed in the paddle fixed to that tongue. This rest extends at right angles to the paddles 33 and defines therewith recesses 45 which, as shown in Fig. 5, receive the lasts and uppers of shoes. The toes of the shoes bear against the rest 34 and the sides thereof bear against the paddles 33.

The paddles and rest are preferably cast or molded from a phenol condensation product, as for example bakelite, and any surfaces with which the shoes may contact are smoothly rounded. Moreover, such material is tough and not easily scarred or scratched and can be kept clean without difficulty, thus reducing to a minimum any damage which might happen to the shoes resting thereon. Heretofore the paddles and rests of shoe racks have been usually made of wood which soon chips and roughens with use, and in order to prevent damage to the shoes these parts have been covered with tape, rubber or the like. In order to save material and reduce the weight of these parts without impairing the strength thereof, the under sides are concave, bosses or fins being provided where necessary to support the securing elements and give the required strength. (See Figs. 7 and 8.)

The rack guiding member 35 comprises a metal plate 50 and a fibre wear plate 51 secured to the flange 37 as by screws 52, and a pair of wheels 53 which are secured to the plate 50 by sleeves 54 and rotate freely upon antifriction bearings 55. Bosses 56 formed in the flange 37 permit the extension of the sleeves 54 through the plate. A pin 57 carried by the sleeve of one of the wheels of each rack is secured to the chain 31 (see Figs.

5 and 6) so that, as will be set forth below, the racks will travel along a fixed path.

The chain 31 passes around a head sprocket 60 at the drive end and a foot sprocket 61 at the take-up end. These sprockets are mounted upon shafts 62 and 63 respectively and the head sprocket 60 is driven from a motor or other source of supply (not shown) through a sprocket or pulley 64. The shafts 62, 63 are carried by a frame 65 having inner and outer walls 66 and 67 respectively. Brackets 68 projecting inwardly from the wall 66 past the plane of the chain and sprockets support a face plate 69 having an opening therein and central face plates 70 in the opening of the face plate 69 and surrounded thereby. The plates 69 and 70 are in the same plane and their adjacent edges are spaced apart to form an endless track 71 in which the hubs 72 of the wheels 53 travel as shown in Fig. 5. The flanges 73 of the wheels extend behind the plates 69 and 70 to prevent disengagement from the tracks.

Since, as pointed out above, one wheel only of each rack 30 is connected to the chain 31 and it is desired that the shoe supporting paddles travel at all times in parallel planes, the following means are provided to guide the racks around the chain sprockets. Mounted in the plane of the plates 69 and 70 are follower disks 74 and 75, the former disk being at the left of the head sprocket 60 and the latter disk being at the left of the foot sprocket 61. The disk 74 is located between the central face plates 70, the adjacent edges of which are arcs of cylinders having the same centers as the periphery of the disk. The disk 75 is spaced from the inner edge of the face plate 69 to form a continuation of the track 71. Equally spaced arcuate recesses are formed in the peripheries of the disks there being six recesses 76 in the disk 74 and two recesses 77 in the disk 75. The disks are carried by shafts 78 and 79 respectively, each driven by the shaft of the adjacent sprocket as through a gear train 80.

Figure 4:
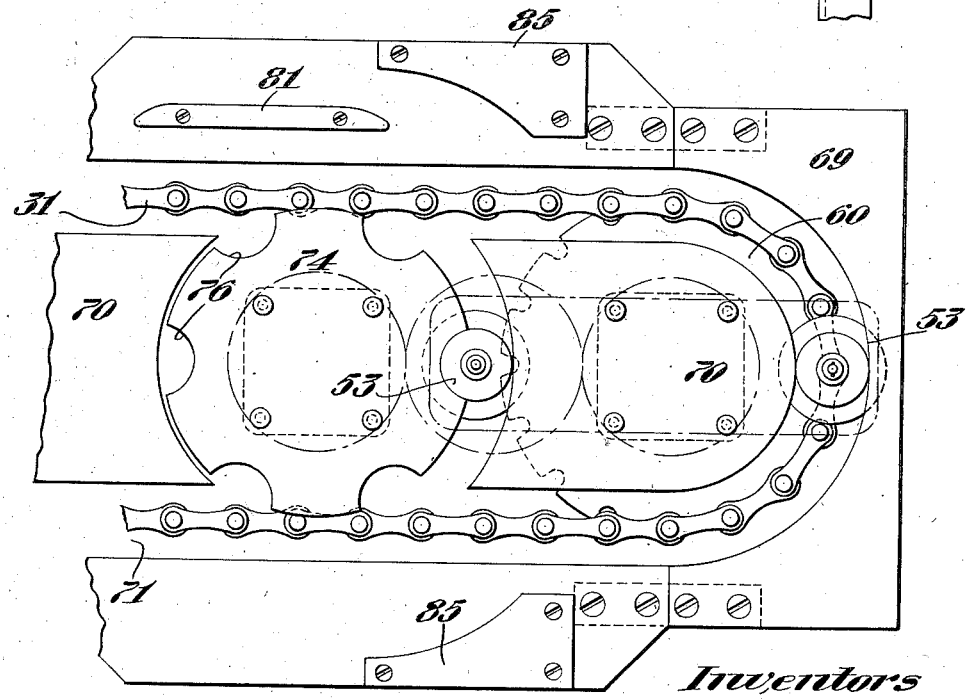
Fig. 4 is a similar view of the drive end thereof.

The chain 31 may be driven in either direction in accordance with the requirements of the particular installation. For ease of description, however, it may be assumed that it is driven in the direction indicated by the arrows on Fig. 2. As a rack travelling along the upper run of the track 71 approaches the head sprocket 60 the fixed wheel, i. e. the one through which the pin 57 passes, which is now in the lead enters one of the recesses 76 in the disk 74 and then continues along the track 71 around the sprocket 60. As that wheel passes over the shaft 62 the free wheel, i. e. the one which is not attached to the chain, enters another of the recesses 76 in the disk. The rack is thus supported at both ends and as it continues its travel the ends are simultaneously lowered by the sprocket 60 and the disk 74 until the wheels enter the lower run of the track. The location of the recesses 76 and speed of rotation of the disk are such that the fixed wheel will enter one of the recesses and pass freely below the disk. As the rack travels along the lower run of the track 71 the free wheel will enter one of the recesses 77 and be raised by the disk 75 as the fixed wheel is raised by the sprocket 61. The intermediate positions taken by the racks during their travel between these two runs of the track are shown in Figs. 3 and 4.

In order to insure the proper movement of the racks, while ascending or descending, guards are provided in the form of a bar 81 arranged above the disk 74, bars 82 arranged above and below the disk 75 and sprocket 61, and ears 83 mounted in the racks 30 above and below the free wheels. Suitable pockets 84 are formed in the flanges 37 to receive the ears which are secured to the plate 50. It will be noted, as shown in the drawings, that such pockets are provided above and below each wheel whereby the racks may be used in other installations than that specifically described, but only those just mentioned are used in this installation. The outer end of each ear 83 is rounded and its back face projects toward the plate 69 over one of the guide bars 81 or 82 (see for example Fig. 5).

As a rack on the upper run of the track 71 approaches the sprocket 60 the ear 83 passes over the guide 81 and prevents the end of the rack carrying the free wheel from dropping into a recess in the disk 74 until the end carrying the fixed wheel starts to descend from the run around the sprocket 60. At the end of the bar 81 is provided a cam plate 85 which engages the rounded end of the ear and directs the rack away from the guide bar so that the free wheel enters a recess 76 on the disk 74 and the end carrying that wheel descends from the run around the disk in unison with the other end of the rack. A second cam plate 85 is provided below the disk 74 which coacts with the lower ear of a rack approaching the sprocket along the lower run of the track 71 and raises the end carrying the free wheel in unison with the other end of the rack until the free wheel is carried by a recess 76 into the space between the disk 74 and the outer face plate 70. The bars 82 similarly coact with the ears as the racks approach the sprocket 61 on either the upper or the lower run, and thus insure the uniform raising or lowering of the racks.

While one embodiment of this invention has been shown and described it will be understood that we are not limited thereto, since other embodiments may be made without departing from the spirit and scope of the invention as set forth in the following claims.

We claim:

1. A conveyer comprising an endless chain, end sprockets over which said chain travels, and a plurality of cars, each car being secured at one end to said chain and being provided at the other end with a wheel, in combination with a track along which the cars are transported by the chain, said track being defined by the edges of plates and disks mounted in a common plane and including an outer plate having an opening therein, two inner plates mounted within said opening and terminating in front of said sprockets, and two disks mounted within said opening, adjacent to and movable in unison with said end sprockets, one of said disks being between the two inner plates and the other of said disks being outside said plates, said wheel being, during the greater part of the car travel, continuously in contact with said outer plate and seriatim in contact with said disks and one of said inner plates, and, during substantially the remainder of the car travel, in contact with one of said disks and the other of said inner plates, such contacts of the wheel of each car with the disks and plates taking place as the portion of the chain to which such car is secured travels around said sprockets.

2. A conveyer comprising an endless chain, end sprockets over which said chain travels and a plurality of cars, each car being secured at one end to said chain and being provided at the other end with a wheel, in combination with a track along which the cars are transported by the chain, said track being defined by the edges of plates and disks mounted in a common plane and including an outer plate having an opening therein, two inner plates mounted within said opening and terminating in front of said sprockets, and two disks mounted within said opening, adjacent to and movable in unison with said end sprockets, one of said disks being between the two inner plates and the other of said disks being outside said plates, said wheel being, during the greater part of the car travel, continuously in contact with said outer plate and seriatim in contact with said disks and one of said inner plates, and, during substantially the remainder of the car travel, in contact with one of said disks and the other of said inner plates, such contacts of the wheel of each car with the disks and plates taking place as the portion of the chain to which such car is secured travels around said sprockets, and means for directing said wheels into contact with said disks.

3. A conveyer comprising an endless chain, end sprockets over which said chain travels, and a plurality of cars, each car being secured at one end to said chain and being provided at the other end with a wheel, in combination with a track along which the cars are transported by the chain, said track being defined by the edges of plates and disks mounted in a common plane and including an outer plate having an opening therein, two inner plates mounted within said opening and terminating in front of said sprockets, and two disks mounted within said opening, adjacent to and movable in unison with said end sprockets, one of said disks being between the two inner plates and the other of said disks being outside said plates, said wheel being, during the greater part of the car travel, continuously in contact with said outer plate and seriatim in contact with said disks and one of said inner plates, and, during substantially the remainder of the car travel, in contact with one of said disks and the other of said inner plates, such contacts of the wheel of each car with the disks and plates taking place as the portion of the chain to which such car is secured travels around said sprockets and means carried by said cars and said outer plate which coact to direct said wheels into contact with said disks.

4. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, said wheels being, during the greater part of the car travel, continuously in contact with said outer plate, the wheel adjacent the chain securement being seriatim in contact with said inner plates and the disk mounted between them, and the other wheel being seriatim in contact with one of said inner plates and said disks, and, during substantially the remainder of the car travel, the first-named wheel being in contact with one of said inner plates and the last-named wheel being in contact with one of said disks and the other of said inner plates, the contact of the last-named wheel of each car with a disk taking place while the first-named wheel of such car is carried by the chain around a sprocket.

5. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, said wheels being, during the greater part of the car travel, continuously in contact with said outer plate, the wheel adjacent the chain securement being seriatim in contact with said inner plates and the disk mounted between them, and the other wheel being seriatim in contact with one of said inner plates and said disks, and, during substantially the remainder of the car travel, the first-named wheel being in contact with one of said inner plates and the last-named wheel being in contact with one of said disks and the other of said inner plates, the contact of the last-named wheel of each car with a disk taking place while the first-named wheel of such car is carried by the chain around a sprocket and means for directing said last-named wheel into contact with said disks.

6. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, said wheels being, during the greater part of the car travel, continuously in contact with said outer plate, the wheel adjacent the chain securement being seriatim in contact with said inner plates and the disk mounted between them, and the other wheel being seriatim in contact with one of said inner plates and said disks, and, during substantially the remainder of the car travel, the first-named wheel being in contact with one of said inner plates and the last-named wheel being in contact with one of said disks and the other of said inner plates, the contact of the last-named wheel of each car with a disk taking place while the first-named wheel of such car is carried by the chain around a sprocket and means for directing said last-named wheel into contact with said disks and limiting the contact of said first-named wheel with one of said disks.

7. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, said wheels being, during the greater part of the car travel, continuously in contact with said outer plate, the wheel adjacent the chain securement being seriatim in contact with said inner plates and the disk mounted between them, and the other wheel being seriatim in contact with one of said inner plates and said disks, and, during substantially the remainder of the car travel, the first-named wheel being in contact with one of said inner plates and the last-named wheel being in contact with one of said disks and the other of said inner plates, the contact of the last-named wheel of each car with a disk taking place while the first-named wheel of such car is carried by the chain around a sprocket and means carried by said cars and said outer plate which coact to direct said last-named wheel into contact with said disks.

8. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, said wheels being, during the greater part of the car travel, continuously in contact with said outer plate, the wheel adjacent the chain securement being seriatim in contact with said inner plates and the disk mounted between them, and the other wheel being seriatim in contact with one of said inner plates and said disks, and, during substantially the remainder of the car travel, the first-named wheel being in contact with one of said inner plates and the last-named wheel being in contact with one of said disks and the other of said inner plates, the contact of the last-named wheel of each car with a disk taking place while the first-named wheel of such car is carried by the chain around a sprocket and means carried by said cars and said outer plate which coact to direct said last-named wheel into contact with said disks and limiting the contact of said first-named wheel with the disk with which it engages.

9. A conveyer comprising an endless chain, end sprockets over which said chain travels and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, the disks being provided with peripheral recesses which receive the wheels of the cars, said wheels being, during the greater part of the car travel, continuously in contact with said outer plate, the wheel adjacent the chain securement being seriatim in contact with said inner plates and in recesses of the disk mounted between them, and the other wheel being seriatim in contact with one of said inner plates and in recesses of the disks, and, during substantially the remainder of the car travel, the first-named wheel being in contact with one of said inner plates and the last-named wheel resting in a recess of the disk mounted between the inner plates and contacting with one of them, the last-named wheel of each car being in recesses of the disks while the first-named wheel of such car is carried by the chain around the sprockets.

10. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, the disks being provided with peripheral recesses which receive the wheels of the cars, said wheels being, during the greater part of the car travel, continuously in contact with said outer plate, the wheel adjacent the chain securement being seriatim in contact with said inner plates and in recesses of the disk mounted between them and the other wheel being seriatim in contact with one of said inner plates and in recesses of the disks, and, during substantially the remainder of the car travel, the first-named wheel being in contact with one of said inner plates and the last-named wheel resting in a recess of the disk mounted between the inner plates and contacting with one of them, the last-named wheel of each car being in recesses of the disks while the first-named wheel of said car is carried by the chain around the sprockets, and means for directing said last-named wheel into recesses of the disks.

11. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, the disks being provided with peripheral recesses which receive the wheels of the cars, said wheels being, during the greater part of the car travel, continuously in contact with said outer plate, the wheel adjacent the chain securement being seriatim in contact with said inner plates and in recesses of the disk mounted between them and the other wheel being seriatim in contact with one of said inner plates and in recesses of the disks, and, during substantially the remainder of the car travel, the first-named wheel being in contact with one of said inner plates and the last-named wheel resting in a recess of the disk mounted between the inner plates and contacting with one of them, the last-named wheel of each car being in recesses of the disks while the first-named wheel of such car is carried by the chain around the sprockets and means for directing said last-named wheel into recesses of the disks and for limiting the travel of the first-named wheel in a recess of the disk with which it engages.

12. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, the disks being provided with peripheral recesses which receive the wheels of the cars, said wheels being, during the greater part of the car travel, continuously in contact with said outer plate, the wheel adjacent the chain securement being seriatim in contact with said inner plates and in recesses of the disk mounted between them, and the other wheel being seriatim in contact with one of said inner plates and in recesses of the disks, and, during substantially the remainder of the car travel, the first-named wheel being in contact with one of said inner plates and the last-named wheel resting in a recess of the disk mounted between the inner plates and contacting with one of them, the last-named wheel of each car being in recesses of the disks while the first-named wheel of such car is carried by the chain around the sprockets and means carried by said cars and said outer plate which coact to direct said last-named wheel into recesses of the disks.

13. A conveyer comprising an endless chain, end sprockets over which said chain travels, and a plurality of cars, each car being provided at each end with a wheel on which the car rides and being secured adjacent one of said wheels to said chain, in combination with a track along which the cars are transported by said chain, said track being defined by the edges of plates and disks mounted in a common plane and including an outer plate having an opening therein, two inner plates mounted within said opening and terminating in front of said sprockets, and two disks mounted within said opening adjacent to and movable in unison with said end sprockets, one of said disks being mounted between the two inner plates and the other of said disks being outside said plates, the disks being provided with peripheral recesses which receive the wheels of the cars, said wheels being, during the greater part of the car travel, continuously in contact with said outer plate, the wheel adjacent the chain securement being seriatim in contact with said inner plates and in recesses of the disk mounted between them, and the other wheel being seriatim in contact with one of said inner plates and in recesses of the disks, and, during substantially the remainder of the car travel, the first-named wheel being in contact with one of said inner plates and the last-named wheel resting in a recess of the disk mounted between the inner plates and contacting with one of them, the last-named wheel of each car being in recesses of the disks while the first-named wheel of such car is carried by the chain around the sprockets and means carried by said cars and said outer plate which coact to direct said last-named wheel into recesses of the disks and to limit the travel of the first-named wheel in a recess of the disk with which it engages.

HAROLD R. PERRY.
CHESTER S. JENNINGS.